US010387760B2

(12) United States Patent
Wu

(10) Patent No.: US 10,387,760 B2
(45) Date of Patent: *Aug. 20, 2019

(54) RECTIFIER AND LIMITER CIRCUIT CONTROLLED BY SWITCHING SIGNALS, AND PASSIVE RADIO FREQUENCY TAG

(71) Applicants: Excelio Technology (Shenzhen) Co., Ltd., Shenzhen (CN); Wuxi Excelio Technology CO., Ltd., Wuxi (CN)

(72) Inventor: Patrick Bian Wu, Shenzhen (CN)

(73) Assignees: EXCELIO TECHNOLOGY (SHENZHEN) CO., LTD., Shenzhen (CN); WUXI EXCELIO TECHNOLOGY CO., LTD., Wuxi (CN)

( * ) Notice: Subject to any disclaimer, the term of this patent is extended or adjusted under 35 U.S.C. 154(b) by 518 days.

This patent is subject to a terminal disclaimer.

(21) Appl. No.: 15/202,573

(22) Filed: Jul. 6, 2016

(65) Prior Publication Data

US 2016/0314390 A1    Oct. 27, 2016

Related U.S. Application Data

(63) Continuation of application No. PCT/CN2015/070142, filed on Jan. 6, 2015.

(30) Foreign Application Priority Data

Jan. 8, 2014  (CN) .......................... 2014 1 0009344

(51) Int. Cl.
    *G06K 19/07* (2006.01)
(52) U.S. Cl.
    CPC ................. *G06K 19/0709* (2013.01)

(58) Field of Classification Search
    CPC ........... G06K 19/0701; G06K 19/0712; G06K 19/0723; G06K 7/10217; G06K 19/0715;
    (Continued)

(56) References Cited

U.S. PATENT DOCUMENTS 8,588,682 B2 * 11/2013 Wilson ...................... G05F 1/46
                                                     455/41.1

FOREIGN PATENT DOCUMENTS

CN            102244502      * 11/2011

* cited by examiner

*Primary Examiner* — Thien M Le
*Assistant Examiner* — Tae W Kim
(74) *Attorney, Agent, or Firm* — Wayne & Ken, LLC; Tony Hom

(57) ABSTRACT

The present invention relates to the technical field of radio frequency identification, in particular to a rectifier and limiter circuit controlled by switching signals and a passive radio frequency tag comprising the rectifier and limiter circuit. The rectifier and limiter circuit controlled by switching signals provided by the present invention converts DC signals, which are absorbed and rectified by an inductance coil antenna of a passive RFID tag, into high- and low-level signals and inputs the high- and low-level signals into the control input terminals of discharge paths of a rectifier circuit. The discharge paths are controlled to be opened or closed according to the amount of charge. The amplitude limiting control of the circuit voltage is realized by dynamically adjusting the voltage amplitude of a rectifier, thereby meeting the requirements on reliability of over-voltage protection of a semiconductor device on a chip and avoiding saturation of reception at the card reader side.

11 Claims, 10 Drawing Sheets

(58) Field of Classification Search
CPC ..... G06K 7/10237; G01S 13/758; G05F 1/46;
H02H 7/22; H03G 11/002; H03G 11/02;
H04B 5/00; H04B 5/0031; H04B 5/0037;
H04B 5/0075
USPC .......................................................... 235/492
See application file for complete search history.

RECTIFIER AND LIMITER CIRCUIT CONTROLLED BY SWITCHING SIGNALS, AND PASSIVE RADIO FREQUENCY TAG

CROSS-REFERENCE TO RELATED APPLICATIONS

This application is a continuation of International Patent Application No. PCT/CN2015/070142 with a filing date of Jan. 6, 2015, designating the United States, now pending, and further claims priority to Chinese Patent Application No. 201410009344.9 with a filing date of Jan. 8, 2014. The content of the aforementioned applications, including any intervening amendments thereto, are incorporated herein by reference.

TECHNICAL FIELD

The present invention belongs to the technical field of radio frequency identification, and particularly relates to a rectifier and limiter circuit controlled by switching signals, and a passive radio frequency tag containing this rectifier and limiter circuit.

BACKGROUND OF THE PRESENT INVENTION

Passive radio frequency identification (RFID) tags, as they themselves are not designed with any battery, operate relying on electromagnetic energy sent from a card reader. Due to their simple structure and economical practicality, passive RFID tags have been widely applied in the fields of logistics management, asset tracking and mobile healthcare.

When a passive RFID tag operates, it will absorb electromagnetic energy, sent from a card reader, from the surrounding. After absorbing the energy, the passive RFID tag rectifies part of the energy into DC power for powering internal circuits of the passive RFID tag; and the passive RFID tag further inputs the other part of the energy to an internal modulation/demodulation circuit which will demodulate an amplitude modulation signal carried in this energy and send the demodulated signal to a digital baseband portion of the passive RFID tag for processing.

As the distance between the passive RFID tag and the card reader varies, the electromagnetic energy absorbed by the passive RFID tag during operating from the surrounding varies too. When the passive RFID tag is too close to the card reader or the electromagnetic energy sent from the card reader is too high, the strength of a signal received by the passive RFID tag will also be high, so that the voltage sensed on the coil exceeds the voltage-withstanding limit of a transistor for the rectifier module in the chip. As a result, the transistor is damaged permanently, and the RFID tag no longer functions.

The passive RFID tag transmits data to the card reader in a load modulation manner, and the coil at the card reader side acquires the data upon detecting change in the impedance of the coil at the RFID tag side. When the passive RFID tag is too close to the card reader or the electromagnetic energy sent from the card reader is too high, a load modulation signal coupled from the RFID tag side is likely to result in saturation of the receiving end of the card reader, thus to fail the communication. Such failure is more likely to occur in an RTF (Reader Talk First) communication mode where the card reader sends a command first and then waits for a response from the RFID tag.

In order to solve the aforementioned problems of voltage-withstanding reliability and reception saturation of the card reader, it is required to provide an amplitude limitation processing circuit in the interior of an RFID tag chip circuit, in order to ensure that the voltage across both ends of an antenna on the RFID tag is limited to a predetermined value. The implementation of amplitude limitation may be carried out by a method of leaking current from a rectifier branch to the ground, so that the voltage level output by a rectifier is controlled. The most ideal design requires that a current leakage path may be effectively cut off in the case of an extremely weak field, that is, the current is completely not leaked; and in the case of a gradually enhanced field, the current leakage path may control the starting point of current leakage and the amount of leakage current at any time, so as to achieve the purpose of dynamic adjustment.

In the Invention Patent Application No. 201010568305.4, filed on Nov. 30, 2010 by the University of Electronic Science and Technology and entitled Demodulator Circuit for Ultrahigh-frequency Radio Frequency Identification Tap Chip, the amplitude limiting function is realized by a voltage comparator. The voltage comparator compares a magnitude relationship between envelope signals (i.e., data information) generated by an envelope detection circuit and a means value of the envelop signals themselves, so that an inverter following the voltage comparator outputs high or low logic signals, i.e., demodulated signals. As such, even in the case where the signal intensity difference is very large due to a too small distance or a too large distance from a card reader to an electronic tag, the demodulator circuit is still able to self-adaptively ensure the stability of a mean value generation circuit, so as to ensure the normal and stable operation of the demodulator circuit.

The technology of self-adaptively adjusting voltage at the gate of a first PMOS transistor in the above patent is a method for indirectly monitoring the intensity of radio frequency signals. The object of the dynamic adjustment is a PMOS transistor serving as an equivalent resistor, so that the equivalent resistance of the channels of the PMOS transistor under different signal intensities remains stable, that is, the time constant of the filter formed together with a capacitor remains stable, thereby finally realizing stable detection effects and ensuring the normal and stable operation of the demodulator circuit. In the present application, the intensity of radio frequency signals is monitored by the dynamic adjustment of the voltage amplitude of the rectifier, and the object of adjustment is a limiter circuit of the rectifier, so that a current leakage path from an antenna port to the ground is opened to different degrees under different signal intensities, thereby protecting transistors at the radio frequency front-end from being influenced by a high voltage and avoiding saturation of reception at the card reader side.

The PCT Patent Application No. 200880129721.5, filed on Jun. 9, 2008 by Shimadzu Corporation and entitled Limiter Circuit, disclosed a limiter circuit for cutting off voltage values exceeding upper and lower threshold signals by switching on or off transistors. This limiter circuit is used for limiting the signal intensity and is specific to circuits having a constant power input. This limiter circuit is different from the rectifier control circuit used in the present application, and also unable to be applied in an RFID circuit.

In the Invention Patent Application No. 200710058875.7, filed on Aug. 20, 2007 by Tianjin Nandaqiangxin Semiconductor Chip Design Co., LTD. and entitled Radio Frequency Identification Tag Circuit System Structure and Operating Methods and Applications thereof, the unique inventive point is that a power supply line from a rectifier is divided into several paths for different modules, and a viewpoint of improving energy conversion and utilization efficiency is thus provided. First, dividing a power supply line into several paths to be connected to different modules is a common practice in the chip design, and this application fails to clearly explain how to improve the energy conversion and utilization efficiency and what extent the energy conversion and utilization efficiency are improved. If it is desirable to really realize efficiency improvement, the connection method mentioned in this application (it itself is a common connection method) is not enough, and directly supplying power to a high voltage generation circuit of a storage control module by a rectifier output branch will even result in very high power consumption of an oscillator used in a charge pump. Second, this application does not involve the aspect of adjusting the voltage amplitude at the input terminal of a rectifier by switching signals in the present patent application, and thus is not overlapped with the inventive point of the present patent application.

In the Invention Patent No. 200610024814.4, filed by Shanghai Huahong Integrated Circuit Co., LTD. and entitled Limiter and Protector Circuit for Non-contact IC card and Radio Frequency Tag Chip, the following concept was proposed: in a strong field, energy obtained by antenna coupling is limited within an acceptable range, without influencing the normal operation of the subsequent demodulator circuit, voltage stabilizer circuit, docking circuit and reset circuit inside the chip. The differences between this patent and the present application are as follows.

1. Due to different purposes of the limiter circuits, the limiter circuit provided by Shanghai Honghua generates amplitude limiting signals by controlling the charging or discharging of a capacitor by a high-voltage or low-voltage detection circuit. The change in specific field intensity of the amplitude limiting signals has an obviously large time constant, that is, the change in voltage amplitude on the antenna is slowly reflected. This technology can not achieve the purpose of over-voltage protection as provided in the present application because the transistors inside the radio frequency tag chip have been in an unreliable over-voltage driven state within the limited time constant. Therefore, the limiter circuit disclosed by the present application has a very quick response speed to the change in voltage on the antenna and thus may provide for good protection.

2. The limiter circuit provided by Shanghai Honghua has two discharge paths. One discharge path is a slow path, as described above, which is not suitable to over-voltage protection, while the other one is a discharge path controlled by demodulation signals. This technology is substantially different from the technology disclosed by the present application. Among many low-cost radio frequency tag chips applied in access control cards and other fields, a card reader just provides field energy, and the operation of a tag circuit is limited to a simple mode where "the tag is activated and powered after being coupled to energy, and then directly sends information stored in the tag". Such cards has no demodulator circuit as used in this patent and are thus unable to provide signals for controlling the discharge paths. In the limiter circuit disclosed by the present application, the path of the limiter circuit is controlled by the power supply voltage and switching signals output by a judgment circuit, and this has nothing to do with the presence or absence of a demodulator circuit and thus the characteristics of the demodulation signals themselves output by the demodulator circuit. In contrast, the technology disclosed by the present application has a broader range of application in both high-performance radio frequency tags and low-cost radio frequency tags.

3. The switching transistor controlled by high-voltage detection and low-detection signals in Shanghai Honghua Patent has two constant current sources as bias. This will result in large DC power consumption in a passive radio frequency tag system and is disadvantageous for the realization of low power consumption and high sensitivity. The technology disclosed by the present application controls a number of paths having different discharge capabilities to be opened and closed by switching signals output by power detection and judgment circuits, so as to achieve the purpose of amplitude limitation. The technology disclosed by the present application details discharge of current and has better energy efficiency.

4. The limiter circuit provided by Shanghai Honghua has two judgment points, i.e., a critical point for a too low voltage and a critical point for a too high voltage, for detecting the voltage across two ends of an antenna. When the voltage across two ends of the antenna is lower than the critical point for a too low voltage, the charge on a capacitor is discharged. When the voltage across two ends of the antenna is higher than the critical point for a too high voltage, the charge on a capacitor is charged and accumulated. The problem is that two control switches, i.e., an upper control switch and a lower control switch, are both in an OFF state when the voltage across two ends of the antenna is between the two critical points, and the voltage on the capacitor is floating and independent of control by any signal. This is a fatal problem in a passive radio frequency tag chip, and is likely to result in uncontrollable current discharge and thus energy loss, thereby affecting the sensitivity of the tag.

SUMMARY OF PRESENT INVENTION

An objective of the embodiments of the present invention is to provide a rectifier and limiter circuit. The rectifier and limiter circuit converts DC signals, which are absorbed and rectified by an inductance coil antenna of a passive RFID tag, into high- and low-level signals and inputs the high- and low-level signals into the control input terminals of discharge paths of a rectifier circuit. The discharge paths are controlled to be opened or closed according to the amount of charge. The amplitude limiting control of the circuit voltage is realized by dynamically adjusting the voltage amplitude of a rectifier, thereby meeting the requirements on reliability of over-voltage protection of a semiconductor device on a chip and avoiding saturation of reception at the card reader side.

To achieve the above objective, the present invention employs the following technical solutions.

A rectifier and limiter circuit controlled by switching signals is provided, including:

a resonant capacitor, which is connected, between a first antenna terminal and a second antenna terminal, in parallel to a resonant inductor, and configured to form a resonant circuit together with the resonant inductor, receive an external electromagnetic field and couple the external electromagnetic field to a rectifier circuit;

a rectifier circuit, the input terminal of which is connected to a first antenna terminal and a second antenna terminal and configured to convert AC power, to which the resonant circuit is coupled, into DC power, the first output terminal of which outputs the DC power to an external load circuit, the second output terminal of which outputs the DC power to power supply voltage detection and judgment circuits and is configured to supply a judgment voltage to the power supply voltage detection and judgment circuits, and the third output terminal of which is grounded by at least two N-type MOS transistors connected in parallel to serve as a discharge path and configured to output charge to the ground when the field intensity is too high; and at least two power supply voltage detection and judgment circuits, the power input terminals of which are connected to the second output terminal of the rectifier circuit, and the output terminals of which are connected to the control input terminals of at least two discharge paths of the rectifier circuit and configured to control the discharge paths of the rectifier circuit to be opened or closed according to the amount of charge between the first antenna terminal and the second antenna terminal, so as to control the leakage state of the output terminals.

Another objective of the embodiments of the present invention is to provide a passive radio frequency tag containing this rectifier and limiter circuit controlled by switching signals.

In the rectifier and limiter circuit controlled by switching signals provided by the present invention, the discharge paths of the rectifier circuit are provided in parallel with x N-type MOS transistors having different width-to-length ratios and provided with a same number of power supply voltage detection and judgment circuits as that of the x N-type MOS transistors. The output terminals of the power supply voltage detection and judgment circuits are connected to the gates of the N-type MOS transistors, respectively, and configured to control the N-type MOS transistors to be opened or closed, respectively. As the power supply voltage detection and judgment circuits have different amplitude limiting points, the power supply voltage detection and judgment circuits output different high- and low-level signals under the same amount of charge between the first antenna terminal and the second antenna terminal, and the high- and low-level signals control the N-type MOS transistors connected thereto to be opened for leakage or closed. Due to different width-to-length ratios of the N-type MOS transistors, various different combinations of opening and closing of the N-type MOS transistors realize various different degrees of leakage stage. Using the discharge paths formed of x N-type MOS transistors connected in parallel and x power supply voltage detection and judgment circuits, there are $2^x$ combinations of charge paths (x is a natural number greater than or equal to 2). The larger the numerical value of x is, the more the combinations are, and the higher the accuracy of amplitude limiting and discharging is. This solution is applied in a limiter circuit module in a passive RFID tag circuit, so that the voltage-withstanding performance of a device connected to an inductance coil antenna is reliably ensured. Another outstanding characteristic of this solution is that the implementation of the x power supply voltage detection and judgment circuits connected in parallel is an ultra-low power consumption implementation, and the typical total current consumption is of a nano-ampere scale ($10^{-9}$). Hence, the whole solution is applicable to passive RFID tag systems.

DESCRIPTION OF THE DRAWINGS

To describe the technical solutions in embodiments of the present invention or in the prior art more clearly, the accompanying drawings to be used for describing the embodiments will be introduced simply. Apparently, the accompanying drawings to be described below merely show some embodiments of the present invention, and those skilled in the art may further obtain other drawings according to these drawings without any creative effort.

DETAILED DESCRIPTION OF PREFERRED EMBODIMENTS

Technical solutions in embodiments of the present invention will be described dearly and completely with reference to the accompanying drawings in the embodiments of the present invention. Apparently, the embodiments to be described are merely some embodiments of the present invention rather than all embodiments of the present invention. Based on the embodiments of the present invention, all other embodiments obtained by those skilled in the art without any creative effort shall fall into the protection scope of the present invention.

Figure 1:
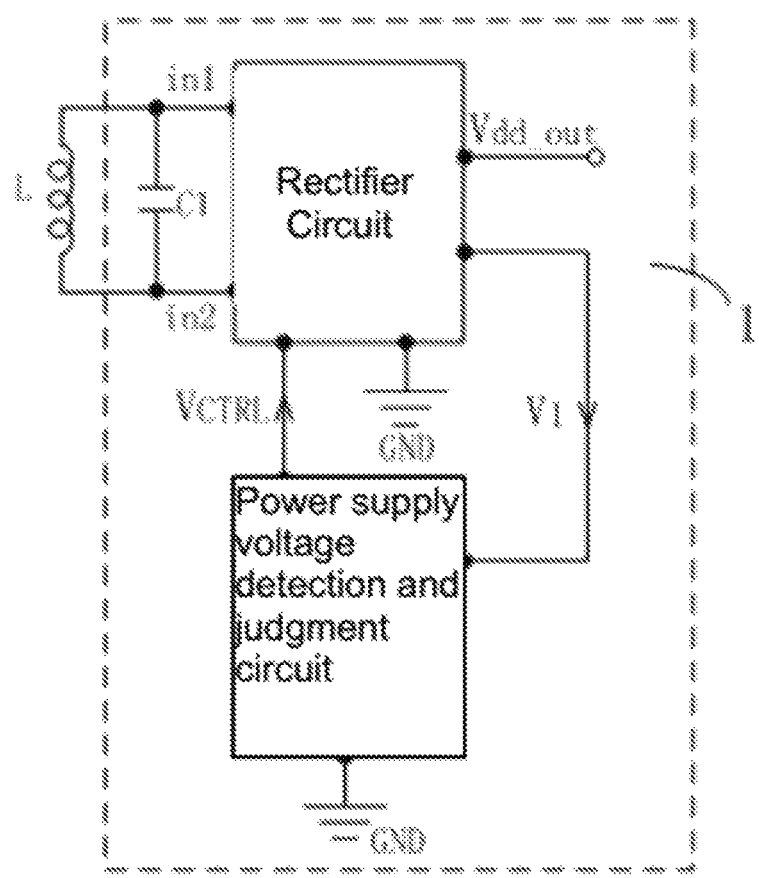
FIG. 1 is a general structure block diagram of a circuit according to the present invention.

As shown in FIG. 1, a general structure block diagram of a circuit according to the present invention is shown. The present invention provides a rectifier and limiter circuit 1 controlled by switching signals, including:

a resonant capacitor C1, which is connected, between a first antenna terminal in1 and a second antenna terminal in2, in parallel to a resonant inductor L, and configured to form a resonant circuit together with the resonant inductor L, receive an external electromagnetic field and couple the external electromagnetic field to a rectifier circuit;

a rectifier circuit 2, the input terminal of which is connected to a first antenna terminal in1 and a second antenna terminal in2 and configured to convert AC power, to which the resonant circuit is coupled, into DC power, the first output terminal $V_{dd\text{-}out}$ of which outputs the DC power to an external load circuit, the second output terminal $V_1$ of which outputs the DC power to power supply voltage detection and judgment circuits 3 and is configured to supply a judgment voltage to the power supply voltage detection and judgment circuits, and the third output terminal of which is grounded by at least two N-type MOS transistors connected in parallel to serve as a discharge path and configured to output charge to the ground when the field intensity is too high; and at least two power supply voltage detection and judgment circuits 3, the power input terminals of which are connected to the second output terminal $V_1$ of the rectifier circuit, and the output terminals $V_{CTRL}$ of which are connected to the control input terminals of at least two discharge paths of the rectifier circuit and configured to control the discharge paths of the rectifier circuit to be opened or closed according to the amount of charge between the first antenna terminal in1 and the second antenna terminal in2, so as to control the leakage state of the output terminals.

In the rectifier and limiter circuit controlled by switching signals provided by the present invention, the discharge paths of the rectifier circuit are provided in parallel with x N-type MOS transistors having different width-to-length ratios and provided with a same number of power supply voltage detection and judgment circuits as that of the x N-type MOS transistors. The output terminals of the power supply voltage detection and judgment circuits are connected to the gates of the N-type MOS transistors, respectively, and configured to control the N-type MOS transistors to be opened or closed, respectively. As the power supply voltage detection and judgment circuits have different amplitude limiting points, the power supply voltage detection and judgment circuits output different high- and low-level signals under the same amount of charge between the first antenna terminal and the second antenna terminal, and the high- and low-level signals control the N-type MOS transistors thereto to be opened for leakage or closed. Due to different width-to-length ratios of the N-type MOS transistors, various different combination forms of opening and closing of the N-type MOS transistors realize various different degrees of leakage stage. This solution is applied in a limiter circuit module in a passive RFID tag circuit so that the voltage-withstanding performance of a device connected to an inductance coil antenna is reliably ensured.

Figure 2:
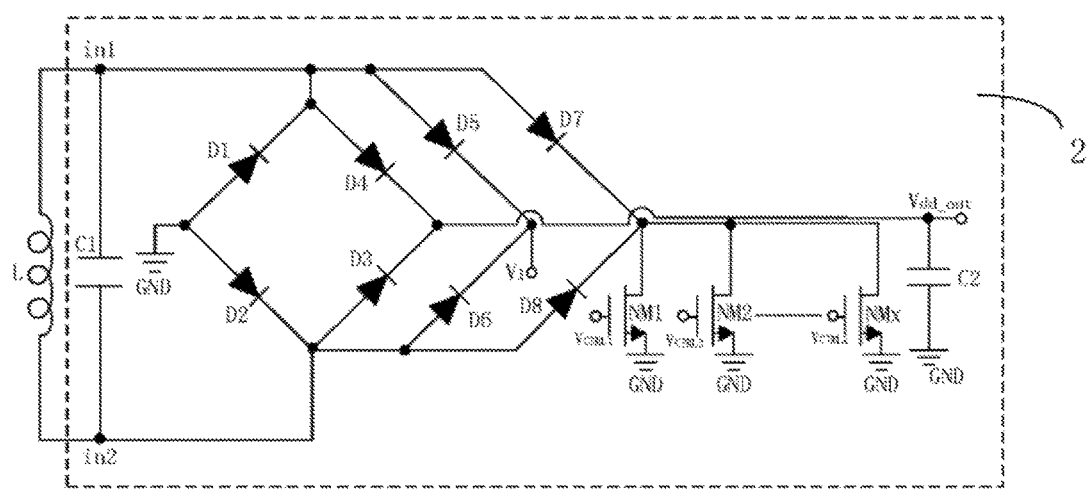
FIG. 2 is a structure diagram of Embodiment 1 of a rectifier circuit according to the present invention.

FIG. 2 is a structure diagram of Embodiment 1 of the rectifier circuit according to the present invention. The rectifier circuit 2 includes a first rectifier branch, a second rectifier branch and a third rectifier branch connected in parallel between the first antenna terminal in1 and the second antenna terminal in2.

The first rectifier branch is a bridge rectifier circuit, one output terminal of which is grounded, the other output terminal $V_{dd-out}$ thereof is connected to an external load circuit and configured to convert AC power, to which the resonant circuit is coupled, into DC power to power the external load circuit.

The second rectifier branch is a fifth diode D5 and a sixth diode D6 connected between the first antenna terminal in1 and the second antenna terminal in2, as shown in FIG. 2. The fifth diode D5 and the sixth diode D6 are configured to convert AC power, to which the resonant circuit is coupled, into DC power and output the DC power to the input terminals of the power supply voltage detection and judgment circuits 3 from the second output terminal $V_1$ of the rectifier circuit for supplying a judgment voltage to the power supply voltage detection and judgment circuits 3.

Figure 3:
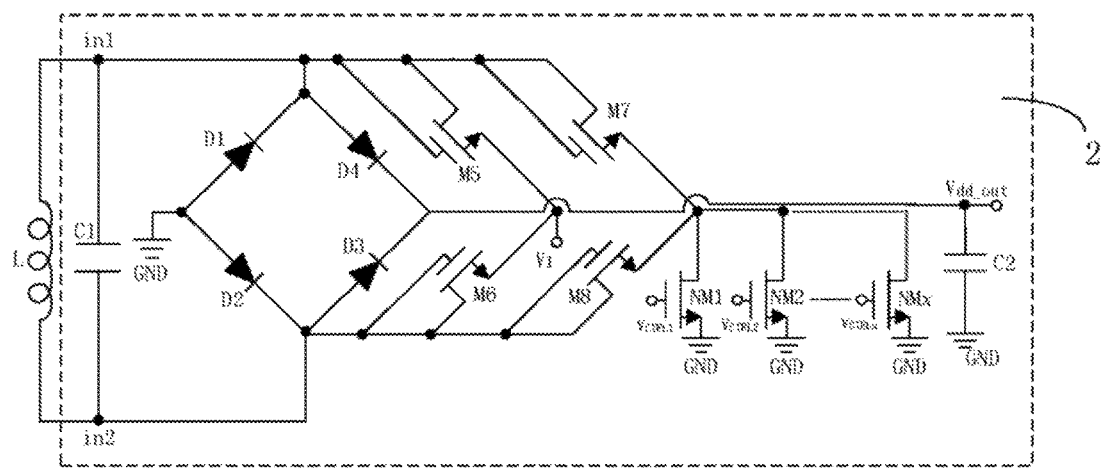
FIG. 3 is a structure diagram of Embodiment 2 of the rectifier circuit according to the present invention.

The structure of a second embodiment of the second rectifier branch is as shown in FIG. 3. In this embodiment, the second rectifier branch is a fifth N-type MOS transistor M5 and a sixth N-type MOS transistor M6 connected between the first antenna terminal in1 and the second antenna terminal in2. The gate and drain of the fifth N-type MOS transistor M5 are respectively coupled to the first antenna terminal in1. The gate and drain of the sixth N-type MOS transistor M6 are respectively coupled to the second antenna terminal in2. The source of the fifth N-type MOS transistor M5 is coupled to the source of the sixth N-type MOS transistor M6, and configured to convert AC power, to which the resonant circuit is coupled, into DC power and output the DC power to the input terminals of the power supply voltage detection and judgment circuits 3 from the second output terminal $V_1$ of the rectifier circuit for supplying a judgment voltage to the power supply voltage detection and judgment circuits 3.

The fifth diode D5, the fifth N-type MOS transistor M5, the sixth diode D6 and the sixth N-type MOS transistor M6 are all one-way conductive electronic elements and configured to rectify AC power between the first antenna terminal in1 and the second antenna terminal in2 into DC power $V_1$. The voltage value of $V_1$ is obtained by subtracting $V_{in1}$ (the AC signal of a positive half cycle) or $V_{in2}$ (the AC signal of a negative half cycle) by the threshold voltage of the diode or MOS transistor.

The third rectifier branch is a seventh diode D7 and an eighth diode D8 connected between the first antenna terminal in1 and the second antenna terminal in2, as shown in FIG. 2. The cathode terminals of the seventh diode D7 and the eighth diode D8 are coupled to the drains of the at least two N-type MOS transistors connected in parallel. The gates of the at least two N-type MOS transistors connected in parallel are respectively connected to the output terminals $V_{CTRL}$ of the power supply voltage detection and judgment circuits 3, and the sources of the N-type MOS transistors are grounded and configured to output charge to the ground when the field intensity is too high, so as to reduce the amount of charge between the first antenna terminal in1 and the second antenna terminal in2.

The structure of a second embodiment of the third rectifier branch is as shown in FIG. 3. In this embodiment, the third rectifier branch is a seventh N-type MOS transistor M7 and an eighth N-type MOS transistor M8 connected between the first antenna terminal in1 and the second antenna terminal in2. The gate and drain of the seventh N-type MOS transistor M7 are respectively coupled to the first antenna terminal in1. The gate and drain of the eighth N-type MOS transistor M8 are respectively coupled to the second antenna terminal in2. The source of the seventh N-type MOS transistor M7 is coupled to the source of the eighth N-type MOS transistor M8 and to the drains of the at least two N-type MOS transistors connected in parallel. The gates of the at least two N-type MOS transistors connected in parallel are respectively connected to the output terminals $V_{CTRL}$ of the power supply voltage detection and judgment circuits 3, and the sources of the N-type MOS transistors are grounded and configured to output charge to the ground when the field intensity is too high, so as to reduce the amount of charge between the first antenna terminal in1 and the second antenna terminal in2.

The seventh diode D7, the seventh N-type MOS transistor M7, the eighth diode D8 and the eighth N-type MOS transistor M8 are one-way conductive electronic elements and configured to rectify AC power between the first antenna terminal in1 and the second antenna terminal in2 into DC power and input the DC power into the drain terminals of the at least two N-type MOS transistors connected in parallel.

The one-way conductive electronic elements playing a rectification role in the first rectifier branch, the second rectifier branch and the third rectifier branch may be any combination of diodes or MOS transistors, including but not limited to, the two combinations as shown in the accompanying drawings, and the enlarging scale of diodes or MOS transistors may be set by adjusting the dimension of the diodes (i.e., the area of PN junction) or adjusting the dimension of channels of the MOS transistors, thereby achieving of the purpose of saving power consumption.

Figure 4:
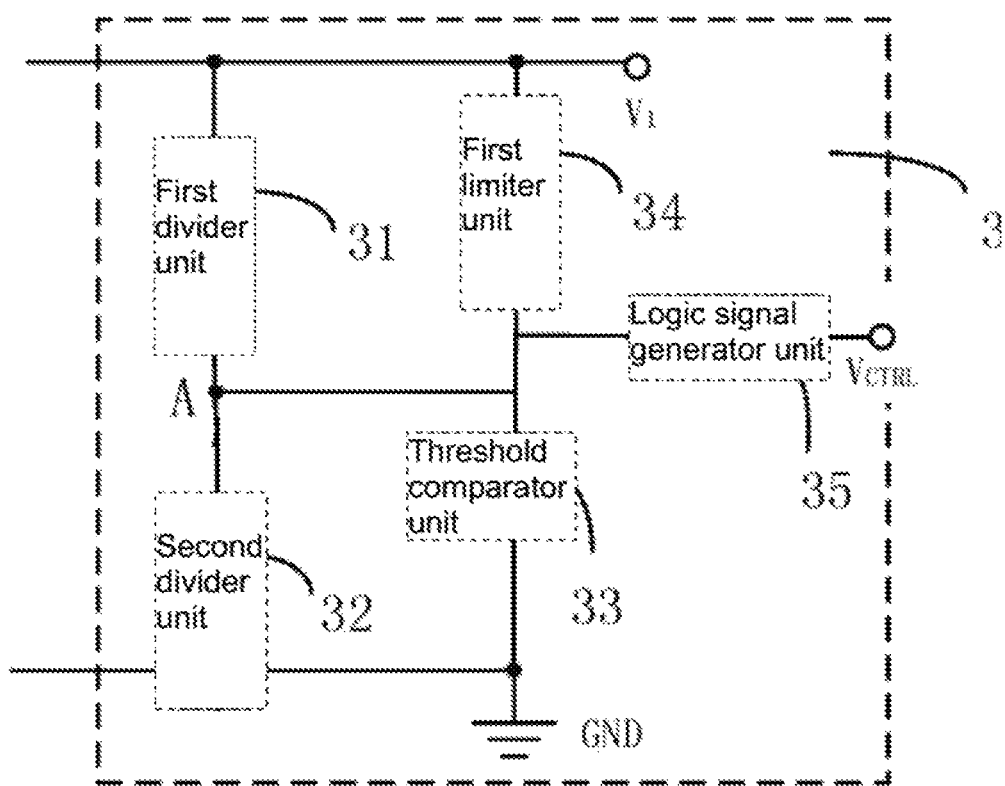
FIG. 4 is a general structure block diagram of power supply voltage detection and judgment circuits according to the present invention.

FIG. 4 is a general structure block diagram of the power supply voltage detection and judgment circuits according to the present invention. There are at least two power supply voltage detection and judgment circuits 3. Each of the power supply voltage detection and judgment circuits 3 is of a parallel structure connected between the second output terminal $V_1$ of the rectifier circuit and a GND. The output terminals $V_{CTRL}$ of the power supply voltage detection and judgment circuits are respectively connected to the gate terminals of the N-type MOS transistors of the discharge paths of the rectifier circuit, and configured to control the discharge paths of the rectifier circuit to be opened or closed according to the amount of charge between the first antenna terminal and the second antenna terminal, so as to control the leakage state or closed state of the output terminals.

Each of the power supply voltage detection and judgment circuits 3 includes a first divider unit 31, a second divider unit 32, a threshold comparator unit 33, a first limiter unit 34 and a logic signal generator unit 35. The first divider unit 31 and the second divider unit 32 are successively connected in series between a power terminal $V_1$ and a GND. The control terminal of the threshold comparator unit 33 is connected between the first divider unit 31 and the second divider unit 32, the input terminal thereof is connected to a current source $V_1$ through the first limiter unit 34, and the output terminal thereof is grounded. The input terminal of the logic signal generator unit 35 is connected between the input terminal of the threshold comparator unit 33 and the first limiter unit 34 and configured to generate a logic control signal for controlling the discharge paths of the rectifier circuit to be opened or closed.

The first divider unit 31 is any one of at least one resistor, at least one P-type MOS transistor or at least one N-type MOS transistor.

Figure 5:
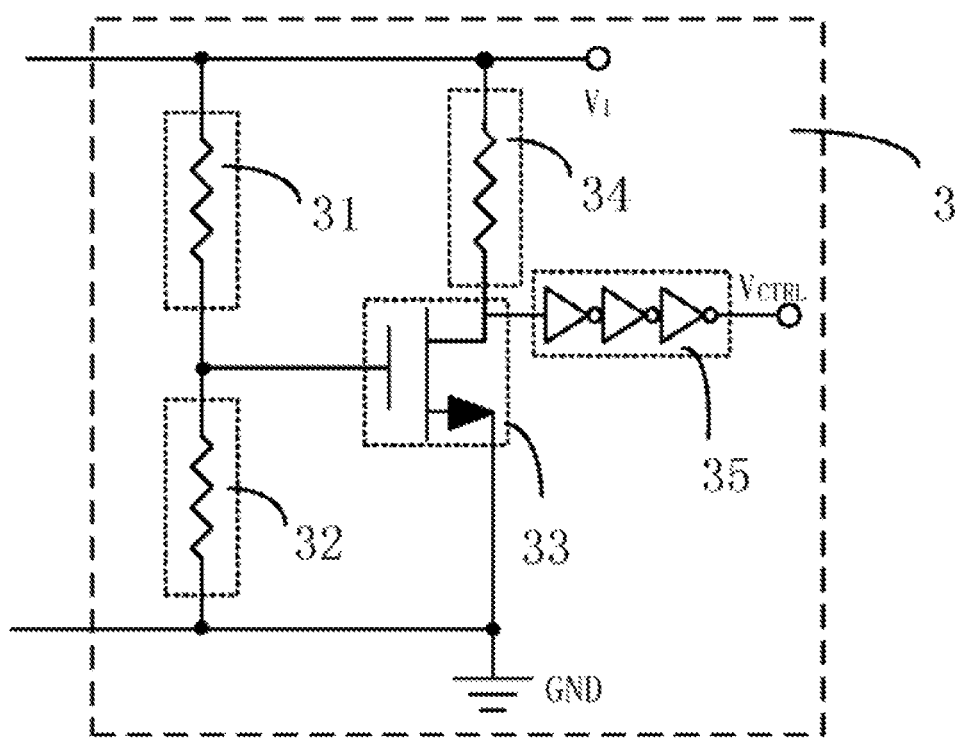
FIG. 5 is a structure diagram of Embodiment 1 of the power supply voltage detection and judgment circuits according to the present invention

When the first divider unit 31 is at least one resistor, the structure is as shown in FIG. 5. The at least one resistor is in head-to-tail connection to an adjacent resistor to form a serial structure, the first resistor is connected to a power supply $V_1$ to serve as the input terminal of the first divider unit 31, and the last resistor is connected to the second divider unit 32 to serve as the output terminal of the first divider unit 31.

Figure 6:
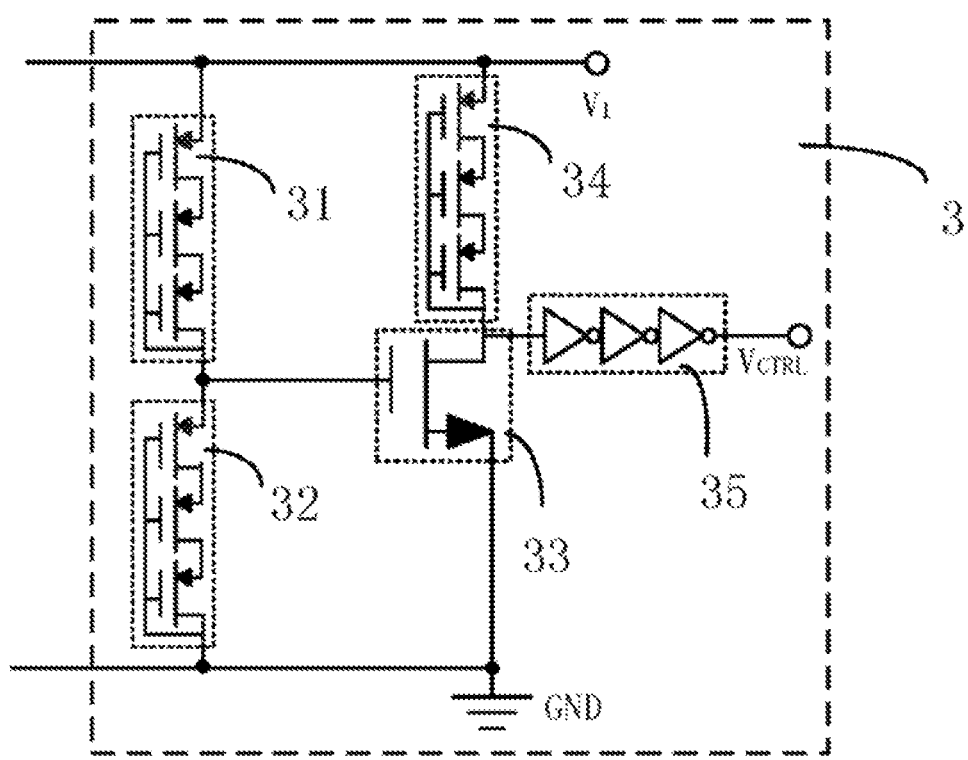
FIG. 6 is a structure diagram of Embodiment 2 of the power supply voltage detection and judgment circuits according to the present invention.

When the first divider unit 31 is at least one P-type MOS transistor, the structure is as shown in FIG. 6. The drain terminal of the at least one P-type MOS transistor is connected to the source terminal of an adjacent P-type MOS transistor to form a serial structure, the source of the first P-type MOS transistor is connected to the power supply $V_1$ to serve as the input terminal of the first divider unit 31, the drain of the last P-type MOS transistor is connected to the second divider unit 32 to serve as the output terminal of the first divider unit 31, and the gate of each P-type MOS transistor is connected to the drain of the last P-type MOS transistor.

Figure 7:
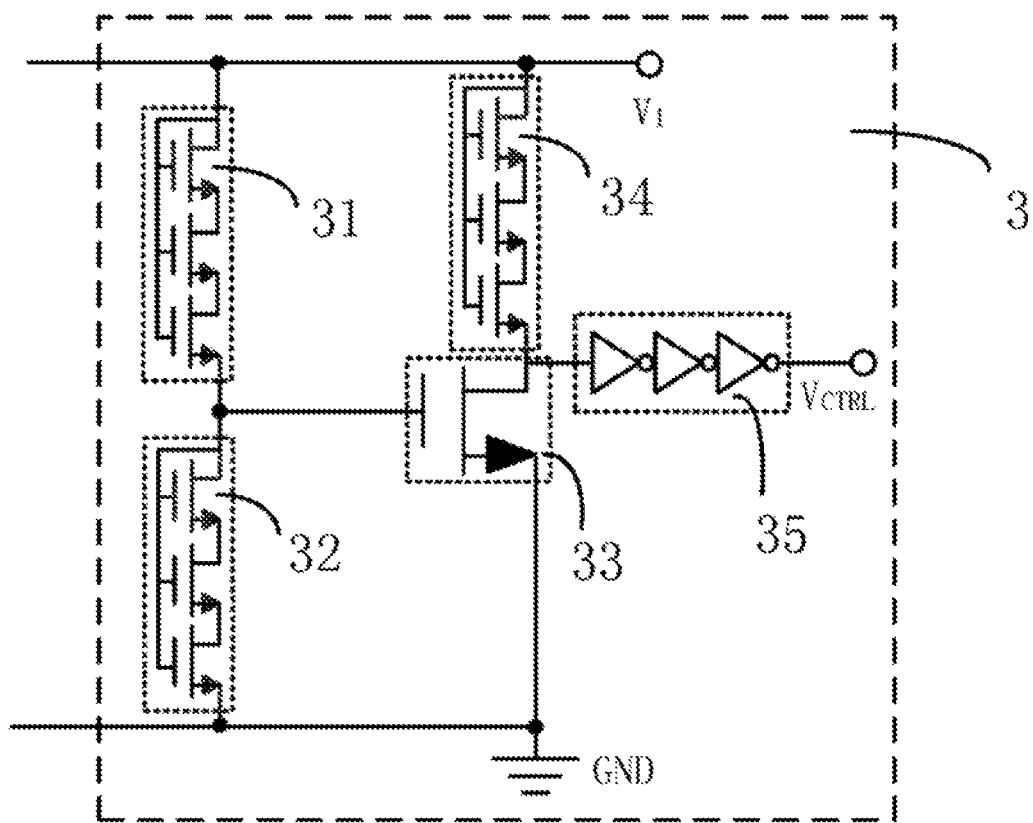
FIG. 7 is a structure diagram of Embodiment 3 of the power supply voltage detection and judgment circuits according to the present invention.
Figure 8:
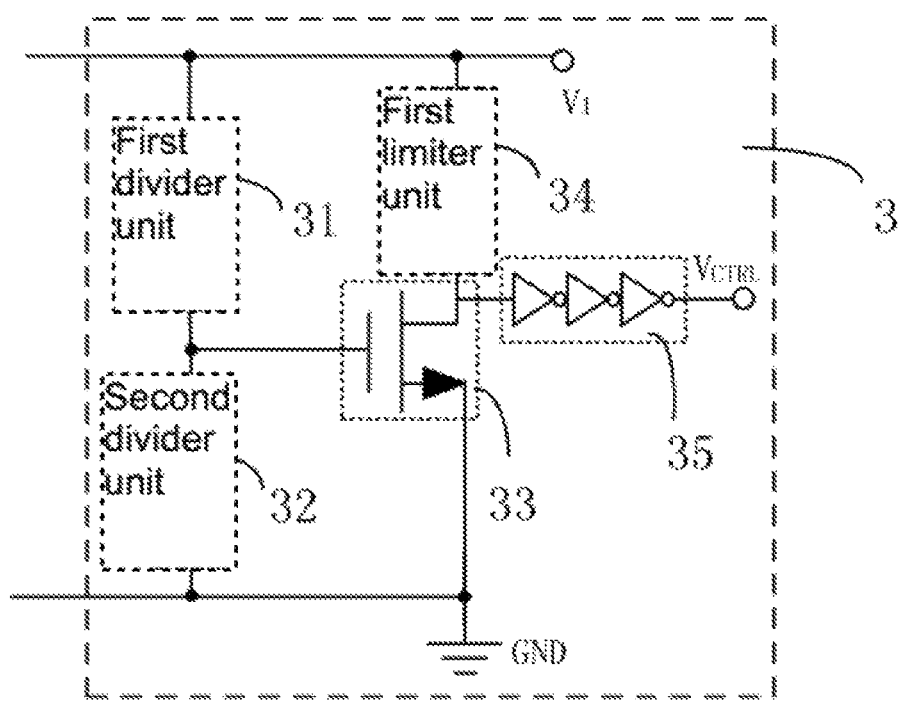
FIG. 8 is a structure diagram of Embodiment 4 of the power supply voltage detection and judgment circuits according to the present invention.

When the first divider unit 31 is at least one N-type MOS transistor, the structure is as shown in FIG. 7. The source terminal of the at least one N-type MOS transistor is connected to the drain terminal of an adjacent N-type MOS transistor to form a serial structure, the drain of the first N-type MOS transistor is connected to the power supply $V_1$ to serve as the input terminal of the first divider unit 31, the source of the last N-type MOS transistor is connected to the second divider unit 32 to serve as the output terminal of the first divider unit 31, and the gate of each N-type MOS transistor is connected to the drain of the first N-type MOS transistor.

The second divider unit 32 is any one of at least one resistor, at least one P-type MOS transistor or at least one N-type MOS transistor.

When the second divider unit 32 is at least one resistor, the structure is as shown in FIG. 5. The at least one resistor is in head-to-tail connection to an adjacent resistor to form a serial structure, the first resistor is connected to a first divider unit 31 to serve as the input terminal of the second divider unit 32, and the last resistor is grounded to serve as the output terminal of the second divider unit 32.

When the second divider unit 32 is at least one P-type transistor, the structure is as shown in FIG. 6. The drain terminal of the at least one P-type MOS transistor is connected to the source terminal of an adjacent P-type MOS transistor to form a serial structure, the source of the first P-type MOS transistor is connected to the first divider unit 31 to serve as the input terminal of the second divider unit 32, the drain of the last P-type MOS transistor is grounded to serve as the output terminal of the second divider unit 32, and the gate of each P-type MOS transistor is connected to the drain of the last P-type MOS transistor.

When the second divider unit 32 is at least one N-type transistor, the structure is as shown in FIG. 7. The source terminal of the at least one N-type MOS transistor is connected to the drain terminal of an adjacent N-type MOS transistor to form a serial structure, the drain of the first N-type MOS transistor is connected to the first divider unit 31 to serve as the input terminal of the second divider unit 32, the source of the last N-type MOS transistor is grounded to serve as the output terminal of the second divider unit 32, and the gate of each N-type MOS transistor is connected to the drain of the first N-type MOS transistor.

The first limiter unit 34 is any one of at least one resistor, at least one P-type MOS transistor or at least one N-type MOS transistor.

When the first limiter unit 34 is at least one resistor, the structure is as shown in FIG. 5. The at least one resistor is in head-to-tail connection to an adjacent resistor to form a serial structure, the first resistor is connected to a power supply $V_1$ to serve as the input terminal of the first limiter unit 34, and the last resistor is connected to the threshold comparator unit 33 to serve as the output terminal of the first limiter unit 34.

When the first limiter unit 34 is at least one P-type MOS transistor, the structure is as shown in FIG. 6. The drain terminal of the at least one P-type MOS transistor is connected to the source terminal of an adjacent P-type MOS transistor to form a serial structure, the source of the first P-type MOS transistor is connected to the power supply $V_1$ to serve as the input terminal of the first limiter unit 34, the drain of the last P-type MOS transistor is connected to the threshold comparator unit 33 to serve as the output terminal of the first limiter unit 34, and the gate of each P-type MOS transistor is connected to the drain of the last P-type MOS transistor.

When the first limiter unit 34 is at least one N-type MOS transistor, the structure is as shown in FIG. 7. The source terminal of the at least one N-type MOS transistor is connected to the drain terminal of an adjacent N-type MOS transistor to form a serial structure, the drain of the first N-type MOS transistor is connected to the power supply $V_1$ to serve as the input terminal of the first limiter unit 34, the source of the last N-type MOS transistor is connected to the threshold comparator unit 33 to serve as the output terminal of the first limiter unit 34, and the gate of each N-type MOS transistor is connected to the drain of the first N-type MOS transistor.

The first divider unit, the second divider unit and the first limiter unit may be separately formed by connecting in series one or more resistors, MOS transistors or other impedance elements. Meanwhile, in each embodiment, the impedance elements used in the first divider unit, the second divider unit and the first limiter unit do not have to be symmetrical, and any one or more impedance elements in each unit may also be connected in series. Due to longer channel dimension and higher resistance, the plurality of MOS transistors connected in series have better impedance characteristics, and their area is mush smaller than the resistor having the same impedance. Therefore, the preferred embodiments of the present invention employ a serial structure having a plurality of MOS transistors connected in series.

The threshold comparator unit 33 is at least one N-type MOS transistor, the structure of which is as shown in FIG. 5 to FIG. 8. The gate of the N-type MOS transistor is connected between the first divider unit 31 and the second divider unit 32 to serve as the control terminal of the threshold comparator unit 33, the drain thereof is connected to the current source $V_1$ through the first limiter unit 34 to serve as the input terminal of the threshold comparator unit 33, and the source thereof is grounded to serve as the output terminal of the threshold comparator unit 33.

Figure 9:
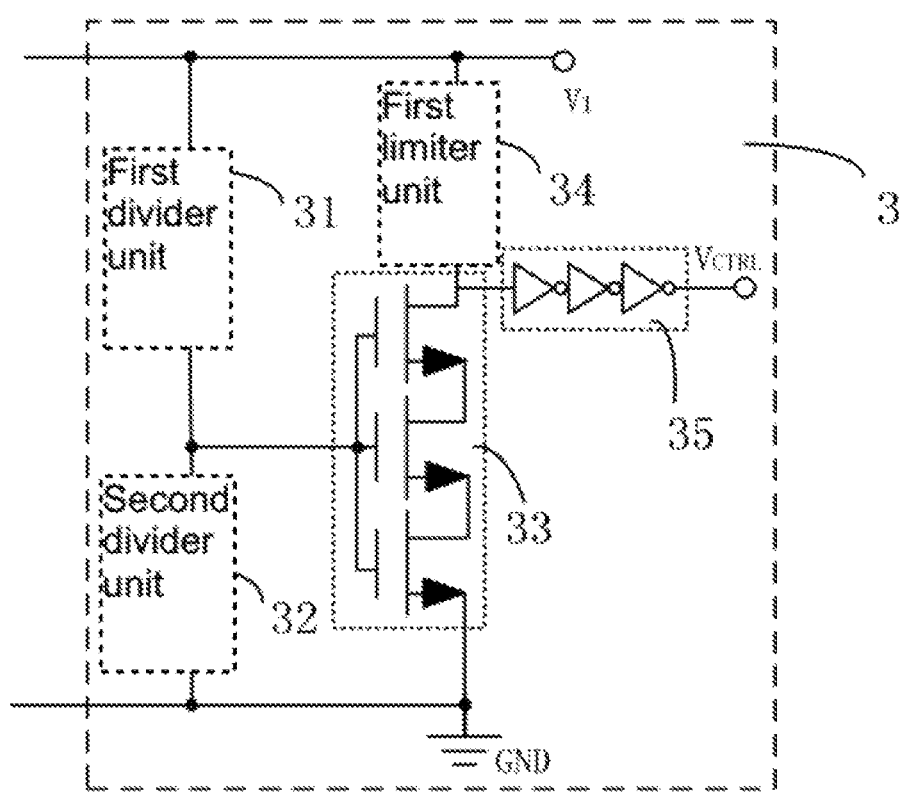
FIG. 9 is a structure diagram of Embodiment 5 of the power supply voltage detection and judgment circuits according to the present invention.

Similarly, the threshold comparator unit 33 in the present invention may also be formed of two or more N-type MOS transistors connected in series. The source terminal of each N-type MOS transistor is connected to the drain terminal of an adjacent N-type MOS transistor to form a serial structure, the drain of the first N-type MOS transistor is connected to the current source $V_1$ through the first limiter unit 34 to serve as the input terminal of the threshold comparator unit 33, the source of the last N-type MOS transistor is grounded to serve as the output terminal of the threshold comparator unit 33, and the gate of each N-type MOS transistor is connected between the first divider unit 31 and the second divider unit 32 to serve as the control terminal of the threshold comparator unit 33, as shown in FIG. 9. With such a structure formed of a plurality of N-type MOS transistors connected in series, the channel dimension of the MOS transistors is lengthened and the width-to-length ratio becomes smaller, so that the turnover time constant of the MOS transistors may become larger and the turnover speed of the threshold unit is delayed, thereby achieving the purpose of reducing ripples of the output power supply. Meanwhile, as the channel dimension of the MOS transistors becomes larger, the resistance is increased, so that the effect of reducing power consumption and limiting current may be realized.

Figure 10:
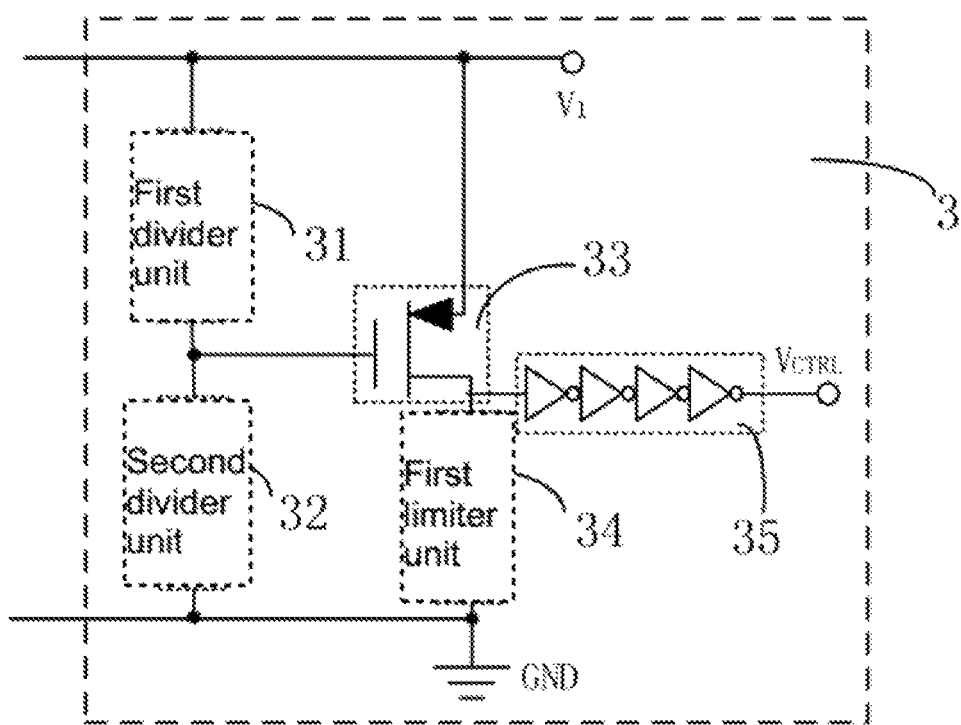
FIG. 10 is a structure diagram of Embodiment 6 of the power supply voltage detection and judgment circuits according to the present invention.

When the threshold comparator unit 33 is a P-type MOS transistor, the structure is as shown in FIG. 10. The gate of the P-type MOS transistor is connected between the first divider unit 31 and the second divider unit 32 to serve as the control terminal of the threshold comparator unit 33, the source thereof is connected to the current source $V_1$ to serve as the input terminal of the threshold comparator unit 33, and the drain thereof is grounded through the first limiter unit 34 to serve as the output terminal of the threshold comparator unit 33.

Similarly, the threshold comparator unit in the present invention may also employ a structure of a plurality of P-type MOS transistors instead of the structure of a single P-type MOS transistor as in FIG. 10, and the connection structure and principle will not be repeated here.

The logic signal generator unit 35 refers to an odd number of inverters connected in series (when the threshold comparator unit is a P-type MOS transistor, there are an even number of inverters connected in series in the logic signal generator unit). The input stage of the first inverter is connected between the threshold comparator unit and the first limiter unit to serve as the input terminal of the logic signal generator unit, and the output stage $V_{CTRL}$ of the last inverter is connected to the control input terminals of the discharge paths of the rectifier circuit and configured to generate logic control signals for controlling the discharge paths of the rectifier circuit to be opened or closed.

The technical solutions disclosed by the present invention may be expressed as follows: a rectifier of a radio frequency identification tag converts a DC voltage $V_1$ from electromagnetic field energy in the surrounding, and the voltage $V_1$ is input to power supply voltage detection and judgment circuits 3. Assumed that the impedance of the first divider unit is $R_1$ and the impedance of the second divider unit is $R_2$, then the current value of the first and second divider unit branches is:

$$I=V_1/(R_1+R_2).$$

The voltage value at point A is:

$$V_A=V_1 \cdot R_2/(R_1+R_2).$$

As such, the voltage value at the control terminal of the threshold comparator unit is:

$$V_{GS}=V_A=V_1 \cdot R_2/(R_1+R_2).$$

It can be seen from the above formulae that, in the case where the voltage value $V_1$ across two ends of the power supply voltage detection and judgment circuits connected in parallel is identical, the voltage value at the control terminal of the threshold comparator unit may be controlled by setting an impedance ratio of the first and second divider units, thereby achieving the purpose of controlling the amplitude limiting point of each power supply voltage detection and judgment circuit.

As an implementation, if V1 is set as 3V, and if it is assumed that the impedance ratio ($R_1$:$R_2$) of the first and second divider units in the first power supply power detection and judgment circuit is equal to 1:1, then $V_{GS}=V_A=1.5V$, which is higher than the threshold ON voltage (0.7V) of the threshold comparator unit, so that the threshold comparator unit of this power supply power detection and judgment circuit is turned on and outputs a low-level signal to the logic signal generator unit. Then, an odd number of inverters connected in series in the logic signal generator unit output this low-level signal as 1 indicative of a high-level logic signal, and input this high-level logic signal $V_{CTRL1}$ to the gate of the N-type MOS transistor of the first discharge path of the rectifier circuit connected thereto so as to turn on the N-type MOS transistor. Then, the charge between the first antenna terminal and the second antenna terminal is output to the ground through the source of the N-type MOS transistor, so that the amount of charge between the first antenna terminal and the second antenna terminal is reduced. Accordingly, the DC power $V_{dd-out}$ rectified by the bridge rectifier circuit is reduced, that is, the voltage across two ends of the load circuit is reduced, thereby achieving the purpose of limiting the amplitude of the circuit.

Similarly, assumed that the impedance ratio ($R_1$:$R_2$) of the first and second divider units in the second power supply power detection and judgment circuit is equal to 1:2, then $V_{GS}=V_A=2V$, which is higher than the threshold ON voltage (0.7V) of the threshold comparator unit, so that the threshold comparator unit of this power supply power detection and judgment circuit is also turned on and generates 1 indicative of a high-level logic signal. Thus, the N-type MOS transistor of the second discharge path of the rectifier circuit connected thereto is turned on to start discharging.

Assumed that the impedance ratio ($R_1$:$R_2$) of the first and second divider units in the $x^{th}$ power supply power detection and judgment circuit is equal to 4:1, then $V_{GS}=V_A=0.6V$, which is lower than the threshold ON voltage (0.7V) of the threshold comparator unit, so that the threshold comparator unit is cut off, and the logic signal generator unit outputs 0 indicative of a low-level logic signal. The low-level logic signal $V_{CTRLx}$ is input to the gate of the N-type MOS transistor of the $x^{th}$ discharge path of the rectifier circuit connected thereto, the N-type MOS transistor is not turned on, and this discharge path is cut off without discharging.

As there are x discharge paths formed of N-type MOS transistors connected in parallel and x power supply voltage detection and judgment circuits in the present invention, there are $2^x$ combinations of opening and closing the discharge paths (x is a natural number greater than or equal to 2). The larger the numerical value of x is, the more the combination forms of the discharge paths are, the more the amplitude limiting and discharging points within an amplitude limiting voltage range are, and the higher the accuracy of amplitude limiting is.

Meanwhile, in the rectifier and limiter circuit controlled by switching signals provided by the present invention, according to the requirements on the response time of the control circuit, the output terminals of the at least two power supply voltage detection and judgment circuits may be respectively connected to the control input terminals of the at least two discharge paths through delay circuits. The most simple implementation form of the delay circuits may be formed of a low-pass filter combined from resistor devices and capacitor devices. In an application scenario requiring the fastest response time, the output terminals of the at least two power supply voltage detection and judgment circuits may be directly connected to the control input terminals of the at least two discharge paths. However, in practical applications, generally, a certain response time will be given to the control circuit to prevent the output power supply from generating large ripples due to the repeated jumping of switching devices such as N-type MOS transistors.

Another objective of the embodiments of the present invention is to provide a passive radio frequency tag including the rectifier and limiter circuit controlled by switching signals. The N-type MOS transistors in the discharge paths of the rectifier circuit in the radio frequency tag have different width-to-length ratios, so the discharging abilities of the discharge paths are different. Meanwhile, for various combinations of opening and closing of the discharge paths, the discharging ability of the limiter circuit is also different, and the opening and closing of the N-type MOS transistors of the discharge paths depend on the input control signals $V_{CTRL}$ connected to the gate terminals. Therefore, by rationally designing the impedance ratio of the first and second divider units in each power supply voltage detection and judgment circuit, $V_{GS}$ of each circuit is made different, that is, the ON voltage of the threshold comparator unit of each circuit is made different. In short, a power supply voltage detection and judgment circuit having a lower threshold ON voltage is connected to a N-type MOS transistor having a lower charging ability, and a power supply voltage detection and judgment circuit having the highest threshold ON voltage is connected to the N-type MOS transistor having the highest charging ability. Thus, when the $V_1$ value rectified by the rectifier circuit of the tag is too low, the amplitude points of all the power supply voltage detection and judgment circuits are higher than the $V_1$ value, so that all the power supply voltage detection and judgment circuits are cut off and output low-level signals to allow the N-type MOS transistors of the discharge paths to be cut off, and the rectifier circuit rectifies all charges at the antenna terminals as DC power for use by the load circuit. When the $V_1$ value is too high, the N-type MOS transistors having a higher discharging ability are opened for quick discharging, thereby realizing the cyclically dynamic rectification control of the circuit voltage and preventing a too high voltage from breaking down the load circuit.

I claim:

1. A rectifier and limiter circuit controlled by switching signals, comprising:
    a resonant capacitor, connected between a first antenna terminal and a second antenna terminal, in parallel to a resonant inductor, and configured to form a resonant circuit together with the resonant inductor, receives an external electromagnetic field and couple the external electromagnetic field to a rectifier circuit;
    a rectifier circuit, connected between the first antenna terminal and the second antenna terminal and configured to convert alternating current power, coupled by the resonant circuit, into direct current power;
    the first output terminal of the rectifier circuit outputs the direct current power to an external load circuit;
    the second output terminal of the rectifier circuit outputs the direct current power to a plurality of power supply voltage detection and judgment circuits, wherein the direct current power supplies judgment voltages to the plurality of power supply voltage detection and judgment circuits; and
    the third output terminal of the rectifier circuit is grounded by a plurality of N-type MOS transistors connected in parallel to serve as a discharge path and configured to output charge to ground (GND) when the external electromagnetic field is too high; and
    power input terminals of the plurality of power supply voltage detection and judgment circuits are connected to the second output terminal of the rectifier circuit; output terminals of the plurality of power supply voltage detection and judgment circuits are respectively connected to controlling input terminals of the plurality of N-type MOS transistors and are configured to control an opening or closing of the N-type MOS transistors according to an amount of charge between the first antenna terminal and the second antenna terminal, so as to control a leakage state of the discharge path;
    the number of the power supply voltage detection and judgment circuits is same as that of the N-type MOS transistors; and width-to-length ratios between the plurality of N-type MOS transistors are different from one another.

2. The rectifier and limiter circuit controlled by switching signals according to claim 1, characterized in that the rectifier circuit comprises a first rectifier branch, a second rectifier branch and a third rectifier branch connected in parallel between the first antenna terminal and the second antenna terminal.

3. The rectifier and limiter circuit controlled by switching signals according to claim 2, characterized in that the second rectifier branch is a fifth diode and a sixth diode connected between the first antenna terminal and the second antenna terminal, or a fifth N-type MOS transistor and a sixth N-type MOS transistor connected between the first antenna terminal and the second antenna terminal; the cathode terminals of the fifth diode and the sixth diode are connected to the input terminals of the power supply voltage detection and judgment circuits and configured to supply a judgment voltage to the power supply voltage detection and judgment circuits; and the gate and drain of the fifth N-type MOS transistor are respectively connected to the first antenna terminal, the gate and drain of the sixth N-type MOS transistor are respectively connected to the second antenna terminal, and the source of the fifth N-type MOS transistor is connected to the source of the sixth N-type MOS transistor and outputs to the input terminals of the power supply voltage detection and judgment circuits and configured to supply a judgment voltage to the power supply voltage detection and judgment circuits.

4. The rectifier and limiter circuit controlled by switching signals according to claim 2, characterized in that the third rectifier branch is a seventh diode and an eighth diode connected between the first antenna terminal and the second antenna terminal, or a seventh N-type MOS transistor and an eighth N-type MOS transistor connected between the first antenna terminal and the second antenna terminal; the cathode terminals of the seventh N-type MOS transistor and the eighth N-type MOS transistor are connected to the drains of the plurality of N-type MOS transistors connected in parallel, the gates of the plurality of N-type MOS transistors connected in parallel are respectively connected to the output terminals of the power supply voltage detection and judgment circuits, and the sources of the N-type MOS transistors are grounded and configured to output charge to the ground when the field intensity is too high; and the gate and drain of the seventh N-type MOS transistor are respectively connected to the first antenna terminal, the gate and drain of the eighth N-type MOS transistor are respectively connected to the second antenna terminal, the source of the seventh N-type MOS transistor is connected to the source of the eighth N-type MOS transistor and to the drains of the plurality of N-type MOS transistors connected in parallel, the gates of the plurality of N-type MOS transistors connected in parallel are respectively connected to the output terminals of the power supply voltage detection and judgment circuits, and the sources of the N-type MOS transistors are grounded and configured to output charge to the ground when the field intensity is too high.

5. The rectifier and limiter circuit controlled by switching signals according to claim 1, characterized in that each of the power supply voltage detection and judgment circuits comprises a first divider unit, a second divider unit, a threshold comparator unit, a first limiter unit and a logic signal generator unit; and the first divider unit and the second divider unit are successively connected in series between a power terminal and the GND; the control terminal of the threshold comparator unit is connected between the first divider unit and the second divider unit, the input terminal thereof is connected to a current source through the first limiter unit, and the output terminal thereof is grounded; and the input terminal of the logic signal generator unit is connected between the input terminal of the threshold comparator unit and the first limiter unit and configured to generate logic control signals for controlling the discharge paths of the rectifier circuit to be opened or closed.

6. The rectifier and limiter circuit controlled by switching signals according to claim 5, characterized in that the first divider unit is any one of at least one resistor, at least one P-type MOS transistor or at least one N-type MOS transistor; among the at least one resistor, any resistor is in head-to-tail connection to an adjacent resistor to form a serial structure, the first resistor is connected to a power supply to serve as the input terminal of the first divider unit, and the last resistor is connected to the second divider unit to serve as the output terminal of the first divider unit; among the at least one P-type MOS transistor, the drain terminal of any P-type MOS transistor is connected to the source terminal of an adjacent P-type MOS transistor to form a serial structure, the source of the first P-type MOS transistor is connected to the power supply to serve as the input terminal of the first divider unit, the drain of the last P-type MOS transistor is connected to the second divider unit to serve as the output terminal of the first divider unit, and the gate of each P-type MOS transistor is connected to the drain of the last P-type MOS transistor; and among the at least one N-type MOS transistor, the source terminal of any N-type MOS transistor is connected to the drain terminal of an adjacent N-type MOS transistor to form a serial structure, the drain of the first N-type MOS transistor is connected to the power supply to serve as the input terminal of the first divider unit, the source of the last N-type MOS transistor is connected to the second divider unit to serve as the output terminal of the first divider unit, and the gate of each N-type MOS transistor is connected to the drain of the first N-type MOS transistor.

7. The rectifier and limiter circuit controlled by switching signals according to claim 5, characterized in that the second divider unit is any one of at least one resistor, at least one P-type MOS transistor or at least one N-type MOS transistor; among the at least one resistor, any resistor is in head-to-tail connection to an adjacent resistor to form a serial structure, the first resistor is connected to a first divider unit to serve as the input terminal of the second divider unit, and the last resistor is grounded to serve as the output terminal of the second divider unit; among the at least one P-type MOS transistor, the drain terminal of any P-type MOS transistor is connected to the source terminal of an adjacent P-type MOS transistor to form a serial structure, the source of the first P-type MOS transistor is connected to the first divider unit to serve as the input terminal of the second divider unit, the drain of the last P-type MOS transistor is grounded to serve as the output terminal of the second divider unit, and the gate of each P-type MOS transistor is connected to the drain of the last P-type MOS transistor; and among the at least one N-type MOS transistor, the source terminal of any N-type MOS transistor is connected to the drain terminal of an adjacent N-type MOS transistor to form a serial structure, the drain of the first N-type MOS transistor is connected to the first divider unit to serve as the input terminal of the second divider unit, the source of the last N-type MOS transistor is grounded to serve as the output terminal of the second divider unit, and the gate of each N-type MOS transistor is connected to the drain of the first N-type MOS transistor.

8. The rectifier and limiter circuit controlled by switching signals according to claim 5, characterized in that the first limiter unit is any one of at least one resistor, at least one P-type MOS transistor or at least one N-type MOS transistor; among the at least one resistor, any resistor is in head-to-tail connection to an adjacent resistor to form a serial structure, the first resistor is connected to a power supply to serve as the input terminal of the first limiter unit, and the last resistor is connected to the threshold comparator unit to serve as the output terminal of the first limiter unit; among the at least one P-type MOS transistor, the drain terminal of any P-type MOS transistor is connected to the source terminal of an adjacent P-type MOS transistor to form a serial structure, the source of the first P-type MOS transistor is connected to the power supply to serve as the input terminal of the first limiter unit, the drain of the last P-type MOS transistor is connected to the threshold comparator unit to serve as the output terminal of the first limiter unit, and the gate of each P-type MOS transistor is connected to the drain of the last P-type MOS transistor; and among the at least one N-type MOS transistor, the source terminal of any N-type MOS transistor is connected to the drain terminal of an adjacent N-type MOS transistor to form a serial structure, the drain of the first N-type MOS transistor is connected to the power supply to serve as the input terminal of the first limiter unit, the source of the last N-type MOS transistor is connected to the threshold comparator unit to serve as the output terminal of the first limiter unit, and the gate of each N-type MOS transistor is connected to the drain of the first N-type MOS transistor.

9. The rectifier and limiter circuit controlled by switching signals according to claim 5, characterized in that the threshold comparator unit is at least one N-type MOS transistor; and among the at least one N-type MOS transistor, the source terminal of any N-type MOS transistor is connected to the drain terminal of an adjacent N-type MOS transistor to form a serial structure, the drain of the first N-type MOS transistor is connected to the current source through the first limiter unit to serve as the input terminal of the threshold comparator unit, the source of the last N-type MOS transistor is grounded to serve as the output terminal of the threshold comparator unit, and the gate of each N-type MOS transistor is connected between the first divider unit and the second divider unit to serve as the control terminal of the threshold comparator unit.

10. The rectifier and limiter circuit controlled by switching signals according to claim 5, characterized in that the logic signal generator unit is an odd number of inverters connected in series, the input stage of the first inverter is connected between the threshold comparator unit and the first limiter unit to serve as the input terminal of the logic signal generator unit, the output stage of the last inverter is connected to the control input terminals of the discharge paths of the rectifier circuit and configured to generate logic control signals for controlling the discharge paths of the rectifier circuit to be opened or closed.

11. A passive radio frequency tag, comprising the rectifier and limiter circuit controlled by switching signals of claim 1.

* * * * *